Aug. 1, 1939.  T. C. LLOYD-JONES ET AL  2,167,980
HARVESTER
Filed Feb. 2, 1938   2 Sheets-Sheet 2
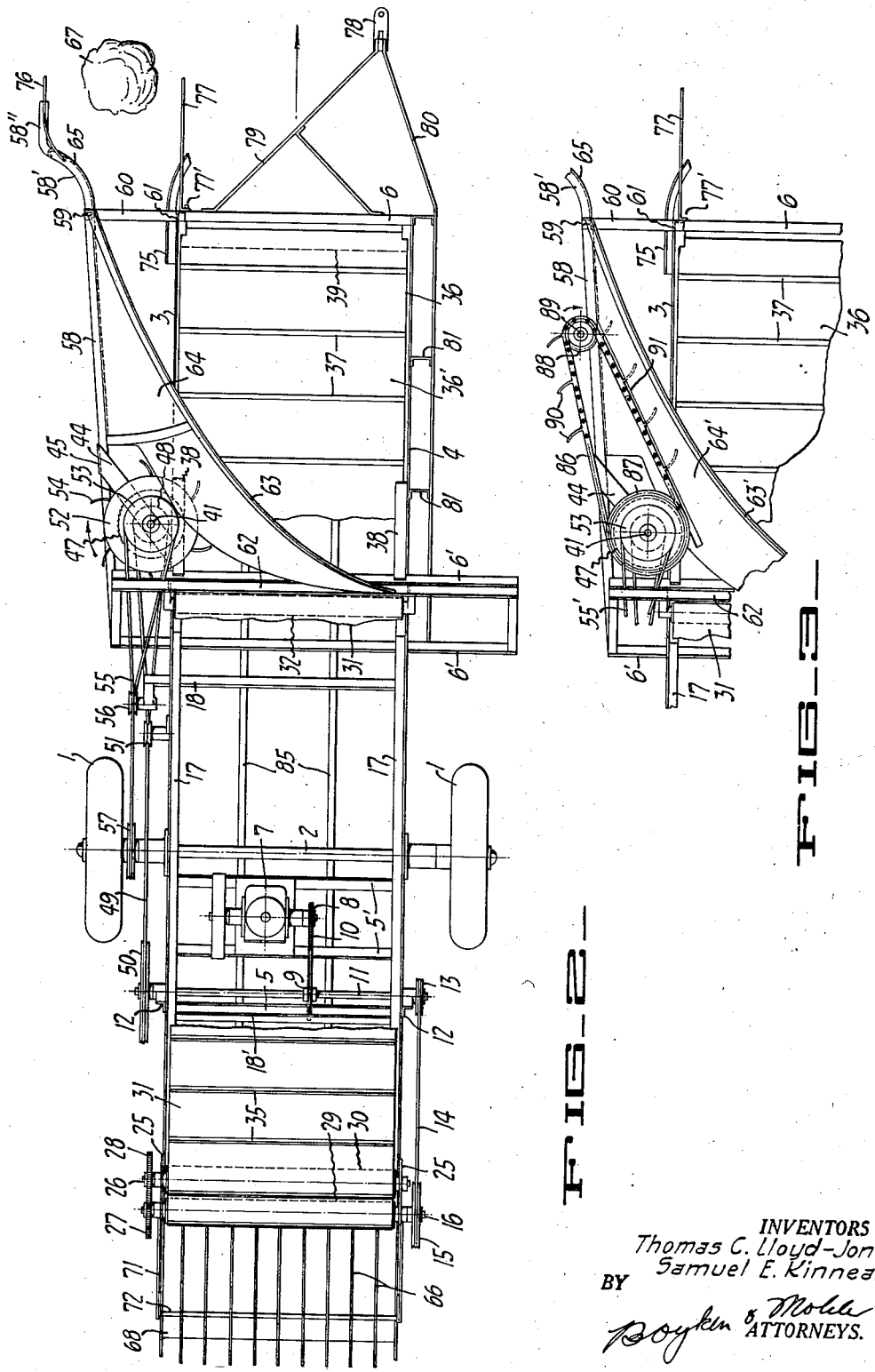
INVENTORS
Thomas C. Lloyd-Jones
Samuel E. Kinnear
BY
ATTORNEYS.

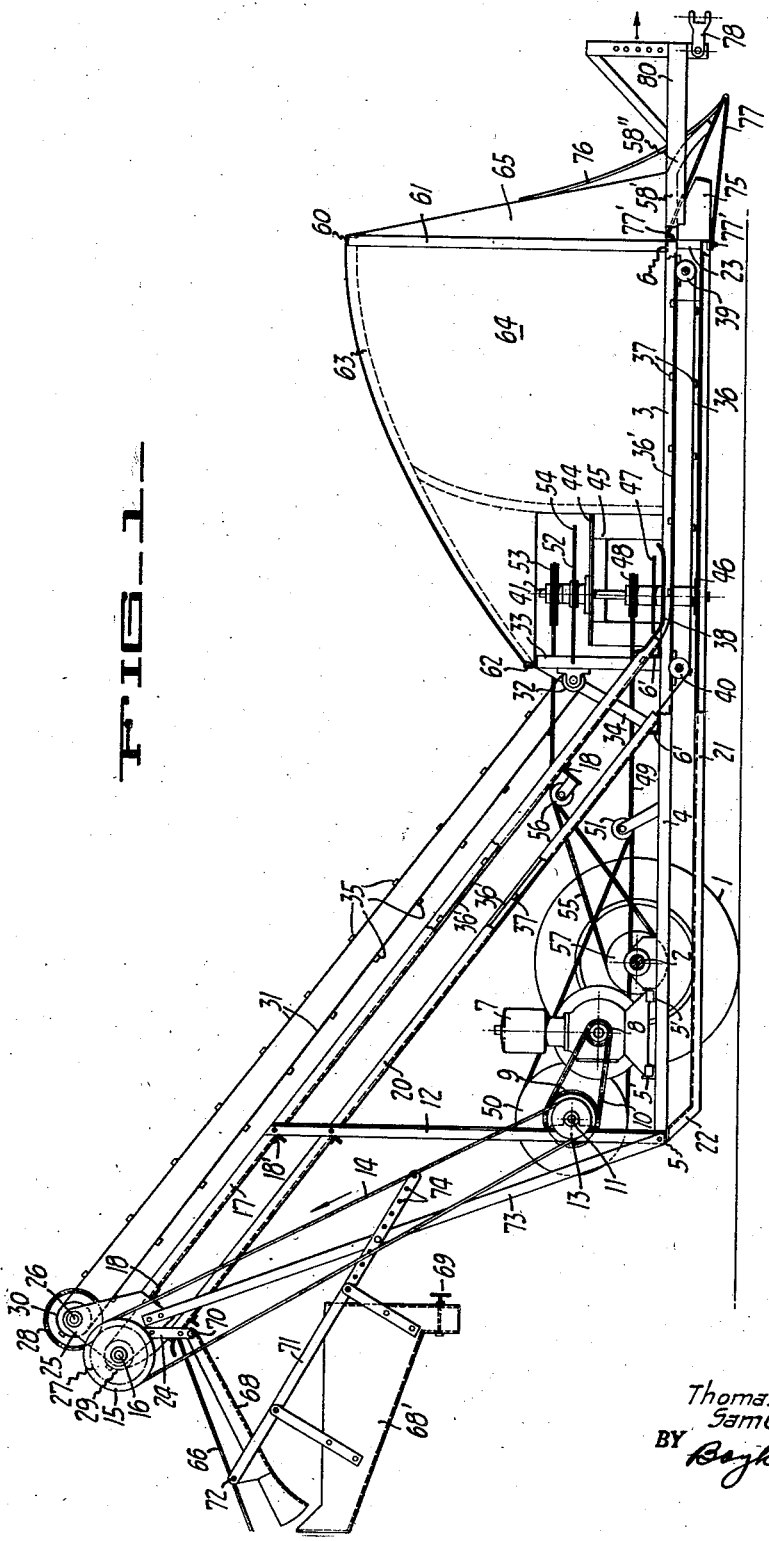

Patented Aug. 1, 1939

2,167,980

UNITED STATES PATENT OFFICE 2,167,980

HARVESTER

Thomas C. Lloyd-Jones and Samuel E. Kinnear, Modesto, Calif.

Application February 2, 1938, Serial No. 188,339

8 Claims. (Cl. 56—185)

This invention relates to row crop harvesters of the type for use in harvesting sesame, perilla and other crops in which ripe and relatively ripe seeds, which it is desirable to save, tend to fall freely to the ground upon agitating the plants.

The objects of the invention are to provide improved apparatus and method for harvesting crops of the above character without substantial loss of the seeds that would normally fall from the plants in harvesting, and to facilitate binding of the cut plants for shocking or thrashing.

Other objects and advantages will be described in the specification and drawings annexed hereto.

In the drawings, Fig. 1 is an elevational view of the invention.

Fig. 2 is a plan view of the invention as disclosed in Fig. 1.

Fig. 3 is a modified fragmentary plan view of a portion of our invention.

In the harvesting of sesame, perilla and other crops bearing valuable seeds that readily drop to the ground when ripe upon agitation of the stalks, ordinary methods of harvesting have proven extremely inefficient due to the loss of seeds upon cutting the stalks. In brief, in the invention hereinafter described, the stalks are initially bent laterally to over an imperforate conveyor or platform without agitation that would cause dislodgement of the ripened seeds, and after the stalks are bent to a position over the platform, they are cut and thereafter carried on the conveyor to a point for binding and shocking or thrashing out the remaining seeds, said stalks being maintained in a position extending transversely of the path of travel of the conveyor with their upper ends in alignment thereon. Thus the cutting and handling of the plants is accomplished with the minimum loss of loose seeds and the subsequent handling of the cut plants and the thrashing out of seeds that have not dropped from the plant is facilitated in a manner to insure recovery of the maximum number of such seeds.

In detail, our invention comprises a pair of ground wheels 1 secured on the ends of an axle 2, which axle rotatably passes through bearings carrying a pair of generally horizontally extending side frame members 3, 4 positioned between the wheels and extending transversely across the axle. Said frame members are of angle iron construction with one of the sides thereof disposed in the same horizontal plane to form supporting surfaces for a conveyor belt, later to be described, and the other sides of the angles extend vertically and adjacent the ground wheels respectively to form guides at opposite edges of the conveyor above mentioned.

The side frame members extend an appreciably greater distance forwardly of the ground wheels than rearwardly thereof, and the rearwardly extending ends of said members are connected by a cross bar or member 5 while the forwardly extending ends are connected by a cross member 6.

Cross members 5' connecting between the portions of side members extending rearwardly of the axle 2 (relative to the forward end of the device) support an engine or motor 7 thereon, said engine having a sprocket 8 on its drive shaft connected with a sprocket 9 by a chain 10. The sprocket 9 is secured on a cross shaft 11, which shaft is rotatably supported adjacent its ends in bearings which are carried on a pair of parallel upright posts 12 that are respectively secured at their lower ends to the frame members 3, 4. Said shaft 11 is carried on said posts above frame members 3, 4, and the shaft extends at its opposite ends outwardly of the posts.

A pulley 13 is secured on one of the outwardly projecting ends of shaft 11 and a belt 14, (preferably a V-belt) extends over pulley 13 and over a pulley 15. The pulley 15 is secured on one end of a shaft 16, which latter shaft is rotatably supported adjacent its ends in bearings secured to the upper ends of inclined members 17, which members are of angle iron construction and which are secured at their lower ends to the side members 3, 4 at points spaced forwardly of the ground wheels. The sides of the angle iron members 17 are disposed generally similar to the sides of the frame members so that the lowermost sides of members 17 will substantially form an upwardly extending continuation of the lowermost sides of the frame members, and the vertical sides of members 17 will likewise form upwardly extending continuation of the vertical sides of the frame members.

Cross members 18 secure members 17 in parallel relation, and one of such cross members, specifically designated 18' engages against the rearward facing sides of posts 12.

Spaced directly below and substantially parallel with members 17 respectively, are similar inclined members 20 of angle iron construction with the sides of the angles disposed similar to the sides of the members 17. Both members 17 and 20 are supported in inclined position on posts 12 and members 20 are secured at their lower ends to members 3, 4. Sub-frame members 21 are disposed directly below side frame members 3, 4, which sub-frame members are substantially parallel with frame members 3, 4 and are of angle iron construction with the sides of the angles of each member 21 disposed similarly to the sides of the frame member directly thereabove. The sub-frame members 21 are secured at their ends to frame members 3, 4 by any suitable means, such as by bending the rear ends upwardly as at 22 for bolting or welding to the rear ends of members 3, 4 and by vertical connecting member 23 extending between the forward ends of the side frame members and sub-frame members (Fig. 1).

The upper ends of superposed members 17, 20 are respectively connected by connecting bars 24, and each of the upper ends of the members 17 carries a vertical plate 25 journaled with bearings rotatably supporting opposite ends of an upper shaft 26 and the shaft 16, which is positioned below shaft 26.

Said shafts 16, 26 are connected for rotation together in opposite directions by spur gears 27, 28 (Fig. 2) which mesh, the gear 27 being secured on the end of shaft 16 opposite the end carrying pulley 15, and gear 28 being secured on the end of shaft 26.

A roller 29 is secured on shaft 16 between the ends of members 17 and a corresponding roller 30 is secured on shaft 26 between its ends.

An endless hold-down belt 31 extends over roller 30 at one end and over a roller 32 (Fig. 1) at its opposite end, which roller 32 is rotatably supported at its ends on upright posts 33 that are secured at their lower ends to frame members 3, 4 and which posts are suitably braced by braces 34.

Belt 31 carries on its outer sides a series of equally spaced slats 35 which slats are preferably of wood and extend transversely of the belt.

An endless carrier belt 36 extends over roller 29 at one end which belt is likewise provided with spaced slats 37 on its outer sides, which slats are disposed in opposed relation to slats 35, since the upper run of belt 36 is spaced below and extends parallel with belt 31. The ends of the slats 37 are covered with metal clips or bindings that also embrace the edges of the belt 36 and opposite the edge margins of belt 36 ride on the upwardly facing surfaces of the generally horizontally disposed sides of angle irons 17 while the lower run of belt 36 is slidably supported at its margins on the upwardly facing surfaces of the sides of angle irons 20 while the vertical sides of angle irons 17, 20 act as guides to prevent lateral displacement of the belt.

The upper run of belt 36 extends from pulley 29 downwardly on the angle iron member 17 to below generally horizontally disposed plates 38 that are respectively secured to the vertical frame sides of side frame members 3, 4 adjacent the upper edges of said vertical sides, and which plates continue upwardly a short distance along the vertical sides of members 17. (Fig. 1) The forward edges of said plates are slightly turned upwardly to facilitate passage of the marginal portions of belt 36 to between said plates and the horizontally disposed sides of the angle irons adjacent thereto.

From plates 38 the upper run of belt 36 continues forwardly along frame members 3, 4 and supported on the horizontally disposed sides of the latter to the forward ends of said frame members where it extends over a roller 39 carried on a shaft that is rotatably mounted at its ends in bearing and suitably secured to the front ends of said side frame members. From roller 39 the belt returns in its lower run on the horizontally disposed sides of angle members 21 to a point slightly forwardly of the lower ends of inclined angle members 20 where it passes below a roller 40 which is on a shaft that is rotatably mounted at its ends in bearings secured to said side frame members, and from roller 40 the belt passes upwardly along angle members 20 which supports its marginal edges on the horizontally extending sides of said frame members, to a position over roller 29.

The belt 14 is actuated by engine 7 in the direction of the arrow whereby the adjacent runs of belts 31, 36 will move upwardly to eject material carried therebetween over pulley 29 and any material that is disposed on the horizontally extending upper run 36' of belt 36 at any point forwardly of plates 38 will be carried rearwardly to pass to between said adjacent runs of belts 31, 36.

Disposed outwardly of frame members 3, 4 at one side thereof adjacent member 3, is a vertical shaft 41 supported at its upper end by a plate 44 which plate is carried on vertical posts 45 and at its lower end by a generally similar plate 46 projecting from a side of sub-frame member 21.

Rotatable on said shaft adjacent its lower end is a horizontally disposed circular saw 47 disposed just above the level of the slats on horizontal upper rim 36' of belt 36, but outwardly of the side edge of said belt. Said saw is rigidly connected to a pulley 48, also rotatable on said shaft, which pulley is actuated by a V-belt 49 extending over an appreciably larger diameter pulley 50 secured on shaft 11. Both runs of said belt pass under an idler pulley 51 that is carried on a bracket extending upwardly from side frame member 3.

Thus the saw is actuated to run in the direction of the arrow shown thereon, at a relatively high rate of speed.

Above the saw 47 and pulley 48 and above plate 44, a circular disk 52 having a pulley 53 secured thereto, is rotatably mounted on said shaft 41. Said disk is larger in diameter than the saw and has outwardly projecting spaced horizontally extending arms 54 (Fig. 2) therearound, which arms are slightly curved from the periphery of the disk in a direction opposite to the direction of rotation of the disk.

The disk is rotated at a speed of travel corresponding to the forward speed of the frame members by means of a V-belt 55 that extends over idler pulley 56 and to over a pulley 57 that is mounted on axle 2 to turn with the ground wheels. Said idler pulley may be mounted on and below angle member 17.

Alongside frame member 3 and positioned along the outer side thereof is an angle iron strip or member 58 (Fig. 2) which member is secured at one end to the rear end of side frame member 3 and extends divergently of side frame member 3 forwardly from said point of securement to about even with the forward end of frame member 2 where member 58 is curved outwardly as at 58' and then forwardly at 58'' to terminate at its forward end spaced from and forwardly of the front end of frame member 3. Said member 58 is supported at about the point of roller 40 on extensions of cross bars 6' that project outwardly and laterally of the frame member 3, said cross bars extending over the upper sides of frame members 3, 4 between the upper and lower runs of belt 36. At about the junction of curve portion 58' and the main body of member 58 a vertical post 59 secured at its lower end on member 58 which post is connected by a horizontal bar 60 at its upper end with the upper end of a vertical post 61 which is secured at its lower end to the forward end of side frame member 3.

Extending from the upper end of post 59 to a cross bar 62 that connects between the upper ends of posts 33 is a curved metal strip 63 the convex side of said curve facing generally forwardly and toward the juncture of said frame member 4 and cross member 6.

The members 58, 58', 62, 63 form a sort of skeleton frame extending upwardly of and facing generally diagonally across the forward horizontal portion 36' of the conveyor belt 36 toward the juncture of side frame member 4 and front cross member 6 and secured against the side of said skeleton frame adjacent said portion 36' of the conveyor is a plate 64 having a vertical forward marginal portion 65 curved around portion 58' of member 58 to present a convex surface adapted to guide vertical plants 67 (Fig. 2) to between the forward end of member 58 and side frame member 3. Rearwardly from marginal portion 65 the plate 64 is slanted generally laterally and forwardly from its lower edge to the upper edge to present a surface facing generally laterally and downwardly toward the portion 36' of the conveyor, said surface being preferably curved so that the surface generally downwardly facing said portion of the conveyor is convex. The plate 64 is cut out at levels where the saw 47 and disk 52 are positioned, whereby the plants 67 will be gradually forced toward a generally horizontal position lying over the portion 36' of the conveyor as the entire apparatus moves forwardly, and when the plants are forced laterally of the direction of travel of the apparatus and over the conveyor 36', the saw will cut the stalk and thereafter the plant will be carried in a horizontal position on the conveyor 36 and lying transversely thereof to between the hold-down belt 31 and said conveyor for travelling over pulley 29 from where the plants successively drop onto the spaced bars 66 from which they are removed for thrashing, or for binding or for shocking and subsequent thrashing. Any seeds that may be spilled from the ripened pods or calyxes will be caught on belt 36, 36' and will drop onto the slanted platform-like chute 68 positioned below the pulley 29, and also any seeds that may be shaken from the plants in dropping onto bars 66 will fall onto said chute for passing downwardly and which seeds may be collected in any convenient receptacle 68' for subsequent packaging or sacking or storage of the same. The receptacle 68' is, of course, suitably valved at 69 for permitting discharge of the seeds therefrom as may be desired. In some instances, the lower end of chute 68 itself may be the collector, in which case it is provided with any conventional means for releasing the seeds therefrom.

The correspondingly positioned opposed slats 37 on conveyor 36, and 35 on hold-down belt 31 prevent the plants from assuming a position extending longitudinally of the conveyor 36, thereby facilitating the handling of the plants for thrashing, and likewise by this means the plants do not become broken in passing over the conveyor as would occur where there is interference between plants tending to change their positions on the conveyor. Thus the seeds that do drop from the plants and onto chute 68 are cleaner than would otherwise be the case.

The inclination of chute 68 and bars 66 may be varied by means of horizontal pivot 70 which connects the upper ends of the chute and bars with member 24, and side braces 71 which pivotally connect with at one of their ends the chute and bars at 72 and which braces 71 are bolted to generally vertical braces 73 adjacent their opposite ends, braces 71 being provided with a row of openings 74 for bolting the braces 71 to braces 73 in the desired position. The braces 73 extend from the rear ends of side members 3, 4 to the side plates 25 that mount rollers 29, 30.

Opposed to the convex surface of member 58' a curved bar 75 extends forwardly of the forward end of side frame member 3, and is secured to the latter, which bar 75 has its convex side facing toward the convex side of member 58', thus forming a guide member opposed to member 58' for facilitating the passage of plants 67 to between members 3 and 58. Also while not absolutely essential, we prefer to provide rearwardly and upwardly slanted rods 76, 77 extending forwardly of the forward ends of members 58'', 75 respectively. Rod 76 is secured at its upper end to the curved forward portion 65 of plate 64 at a point spaced above the lower edge of said portion and adjacent the vertical free edge of portion 65, while rod 77 is secured by any suitable clamp 77' to cross member 6 at a point adjacent the upper side of bar 75 from which point rod 77 extends forwardly over the outer end of bar 75 then downwardly to about the level of the lower end of bar 76, and then rearwardly to connect with clamps 77' below cross bar 6. The forward end 58'' of the member 58 is inclined downwardly as indicated and the lower end of rod 76 is secured to the forward lowered end of portion 58'', the rod 76 preferably extending a slight distance below the forward end of said portion 58''.

The whole apparatus hereinbefore described is drawn in the direction of the arrow (Fig. 2) by a draw bar 78 connected with the front cross member 6 and side frame member 4 respectively, by connecting bars 79, 80. Said bar 79 connects with cross bar 6 at a point adjacent the forward end of side frame member 3 from which point the bar is laterally slanted to a point substantially forwardly of the forward end of side frame member 4, at which latter point said bar connects with the draw bar, and bar 80 extends from the draw bar rearwardly to along the outer side of the forward end of side frame member 4, where it is secured to said side frame member by vertical channels 81 which channels also connect frame member 4 and sub-frame member 21 which is positioned therebelow. The rear end of bar 80 preferably connects with the projecting ends of cross frame members 6' that connect across between side frame members 3, 4 adjacent roller 40.

In the main apparatus, longitudinally extending support members 85 parallel with side frame members 3, 4 and with inclined members 17 are disposed between said frame members to support the main conveyor belt. The supporting members are supported at their ends by suitable cross frame member extending between the members 3, 4, 17.

In operation the machine heretofore described is drawn in the direction of the arrow (Fig. 1) with spaced forward ends of side frame member 3 and member 58 on either side of the row, the draw bar 78 being offset so as to insure the tractor or horses clearing the plants of the row. The plants are gently forced to a position over the forward portion, 36' of the conveyor 36 thereby dropping any loose seeds onto the conveyor, and the plant stalks are cut off after the plants have been forced over said portion 36' of the conveyor. Thereafter the seeds and plants travel upwardly on the conveyor with the latter maintained in positions extending transversely of the conveyor. The loose seeds and stalks pass over the upper end of the conveyor, the seeds dropping through bars 66 onto chute 68 while the plants drop onto bars 66 with their upper ends all facing in one direction, and no stalks or plants will pass between the bars 66 by reason of the transverse position of the plants.

In Fig. 3, the disk 52 is replaced by an endless chain 86 that extends over horizontal sprockets 87, 88, sprocket 87 being secured on shaft 41 and sprocket 88 being rotatably secured on a vertical shaft 89 which shaft is mounted on member 58 adjacent the forward end of plate 64', which corresponds to plate 64 in Fig. 2. Said chain carries outwardly projecting rods 90 thereon that pass through a horizontal slot 91 in plate 64' positioned at about the level of disk 52 in the device of Fig. 1, or lower, as may be desired. Belt 55', similar to belt 55 of Fig. 1 drives that portion of rods 90 extending through slot 91 rearwardly at the forward ground speed of the apparatus, so as to avoid any undue agitation of the plants, and also, by their modified construction, the plants are engaged by rods 90 substantially at the same time the plate 64' (Fig. 3) acts to bend the plants over the conveyor.

Having described our invention, we claim:

1. A harvester for harvesting crops of the character described comprising a frame, ground engaging wheels mounting said frame for movement of the frame normally in one direction, a cutting device on the frame positioned for severing the stalks of the plants to be harvested, plant engaging means on the frame arranged and adapted to engage and to bend the plants to be cut in a direction laterally of the normal direction of movement of the frame in advance of said cutting device and to retain the plants in bended position during severing of the stalks thereof by the cutting device, means on the frame positioned to receive seeds dropped from the plants upon bending thereof by said plant engaging means, conveyor means on the frame positioned to receive the severed plants and to support said plants and to carry said plants away from said cutting device, and means for positively holding said severed plants in positions extending transversely of the direction of movement of the frame during movement of the severed plants away from said cutting device.

2. A harvester of the character described comprising a frame, ground wheels mounting the frame for movement normally in one direction over the ground, an endless conveyor having an upper supporting surface for supporting plants thereon extending longitudinally of the normal direction of movement of the frame, means mounting the conveyor on said frame for movement of the upper supporting surface in a direction rearwardly relative to the normal direction of movement of the frame, means supporting the forward portion of the supporting surface of the conveyor horizontal and means supporting the portion of the supporting surface extending rearwardly of said forward portion in an upwardly inclined position, cutting means on the frame adjacent a lateral side of the conveyor for severing the plant stalks of a row adjacent the surface of the ground, means on the frame for positioning the plant stalks severed by the cutting means in position on the upper supporting surface of the conveyor extending transversely of the conveyor, actuating means for causing the upper supporting surface of the conveyor to move rearwardly relative to the normal directional movement of the frame for carrying the plant stalks up the inclined portion of the conveyor for discharge therefrom at the rear end of said conveyor, and means on the frame for receiving seeds dropped from the plants on the conveyor and for conveying said seeds to a point away from said plants.

3. A harvester of the character described comprising a frame, ground wheels mounting said frame for movement thereof in one direction over the ground, a horizontal conveyor belt on said frame positioned adjacent the forward end thereof and relatively close to the ground, means actuating said conveyor belt for supporting plants thereon for movement rearwardly relative to the direction of travel of the frame, a horizontal circular saw on the frame positioned adjacent the upper side of said belt at one of the side edges thereof and spaced from the forward end of said belt relative to the direction of movement of the frame, guide means disposed alongside said belt extending from said forward end thereof arranged and adapted to guide standing plants to said saw for severing the stalks thereby, upon movement of the frame in said one direction, and means on said frame adjacent said guide means arranged and adapted to engage the standing plants guided by said guide means and to progressively force said standing plants respectively to inclined position extending over said conveyor belt for dropping loose seeds therefrom onto said belt.

4. In a construction as defined in claim 3, said last mentioned means comprising a curved plate having a generally concave surface facing generally toward and across said belt and extending forwardly of said saw to a point adjacent the forward end of said belt.

5. In a construction as defined in claim 3, said last mentioned means including a plurality of spaced, generally horizontally disposed elongated members arranged and adapted to engage plants guided by said guide means, and means for moving said members in a direction generally toward said saw at a rate of movement substantially that of the rate of movement of the frame in said one direction.

6. In a construction as defined in claim 3, plant supporting means at a point adjacent the end thereof of the conveyor belt opposite its forward end for receiving and supporting plants severed by said saw separate from the seeds that may drop from said plants, said conveyor being arranged and adapted to carry the severed plants to said plant supporting means and to eject the severed plants from said belt onto said plant supporting means.

7. A harvester for harvesting crops of the character described comprising a frame, ground wheels mounting said frame for movement thereof over the ground normally in one direction, a cutter on said frame positioned for severing the stalks of the plants to be harvested, plant engaging means on said frame arranged and adapted to bend the plants to be cut in a direction laterally of the normal directional movement of the frame in advance of said cutting device, means on the frame positioned to receive seeds dropped from the plants upon bending thereof by said plant engaging means, and plant conveyor means arranged and adapted to carry the plants in positions extending transversely of said normal directional movement rearwardly and to discharge said plants in said positions from the harvester.

8. A harvester for harvesting crops of the character described comprising a frame, ground wheels mounting said frame for movement thereof over the ground normally in one direction, a cutter on said frame positioned for severing the stalks of the plants to be harvested, plant engaging means on said frame arranged and adapted to bend the plants to be cut in a direction laterally of the normal directional movement of the frame in advance of said cutting device, means on the frame positioned to receive seeds dropped from the plants upon bending thereof by said plant engaging means, said plant engaging means comprising a guide plate extending upwardly from the cutting device and in a direction toward the normal directional movement of the frame and said guide plate being curved forming a concave side facing generally laterally toward the means for receiving the seeds and forwardly toward the forward end of the harvester.

THOMAS C. LLOYD-JONES.
SAMUEL E. KINNEAR.